United States Patent Office 2,727,501
Patented Dec. 20, 1955

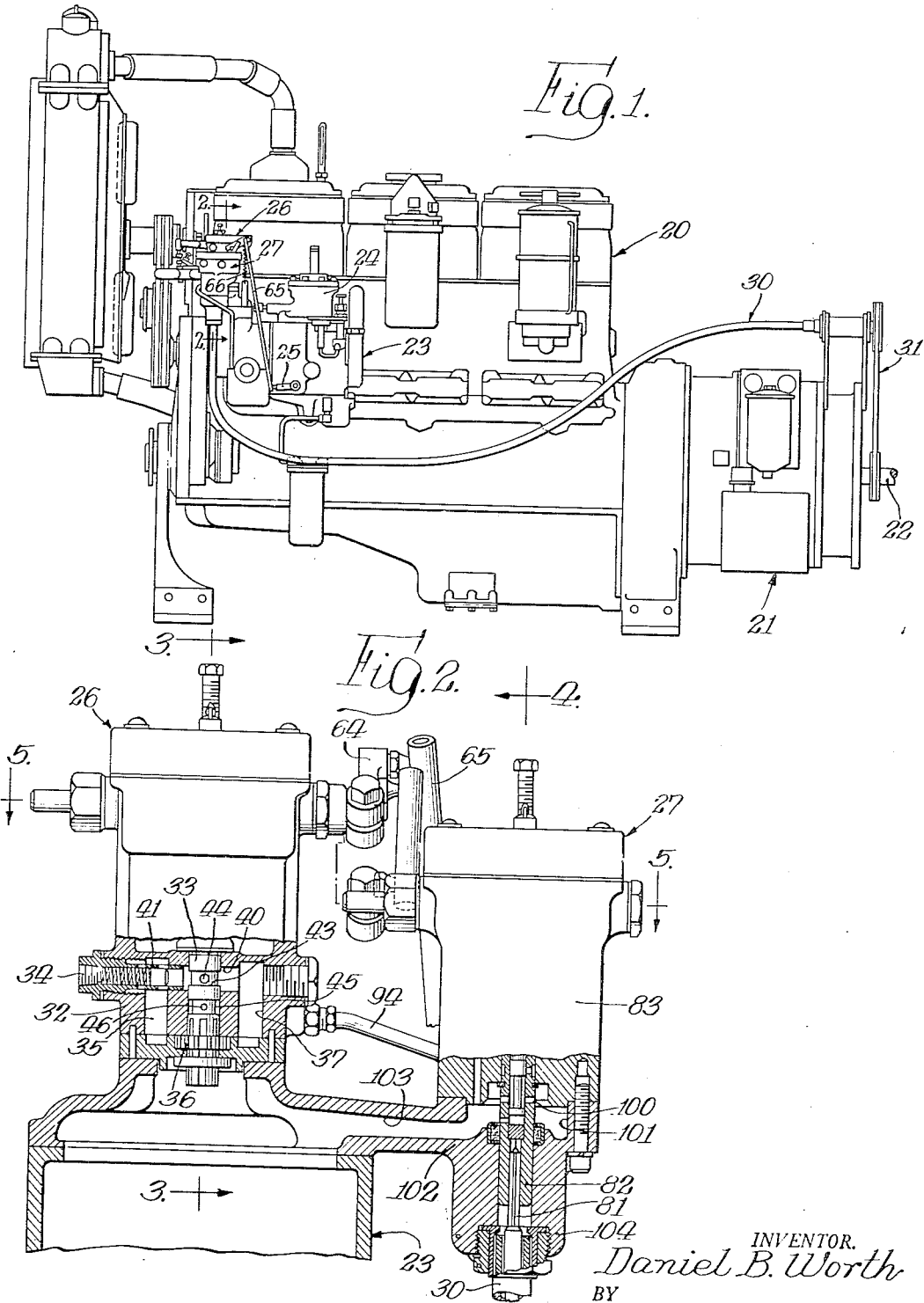

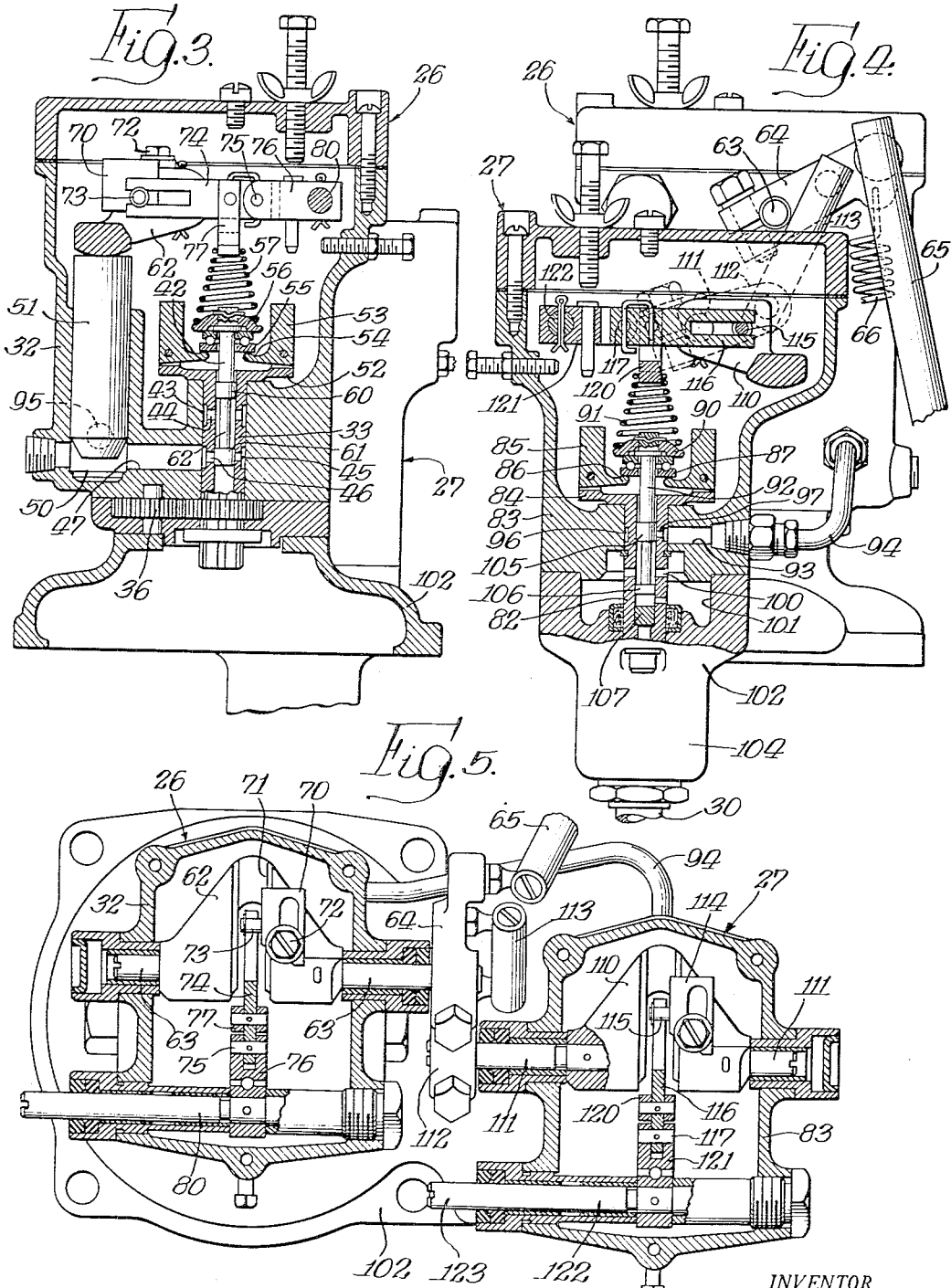

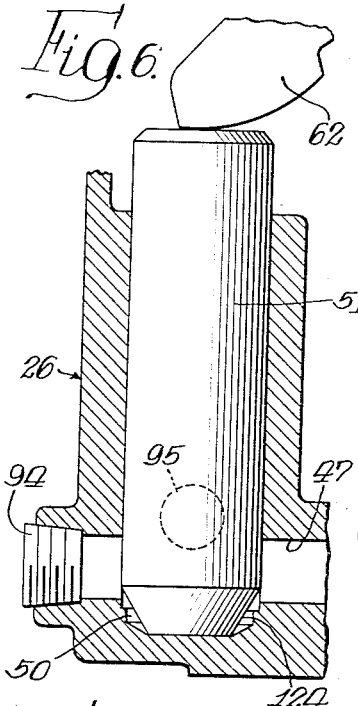
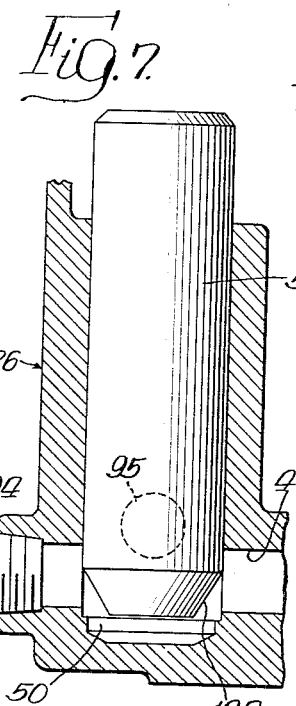
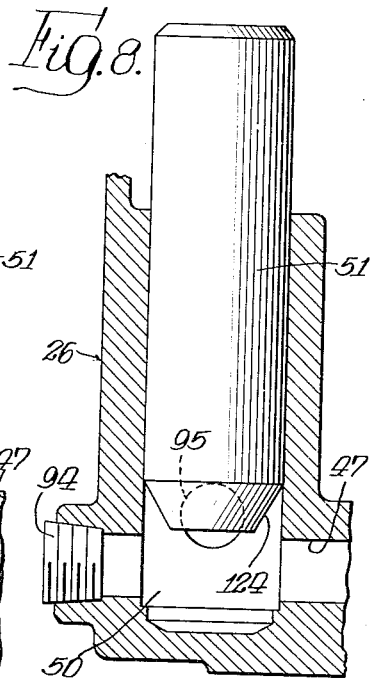
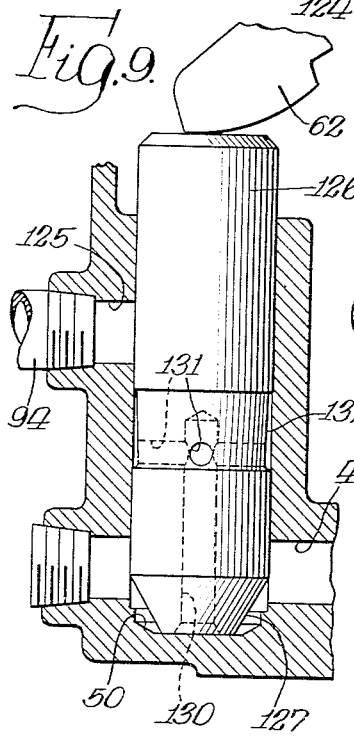
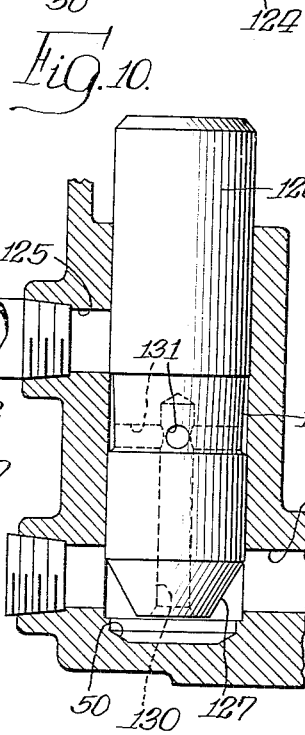
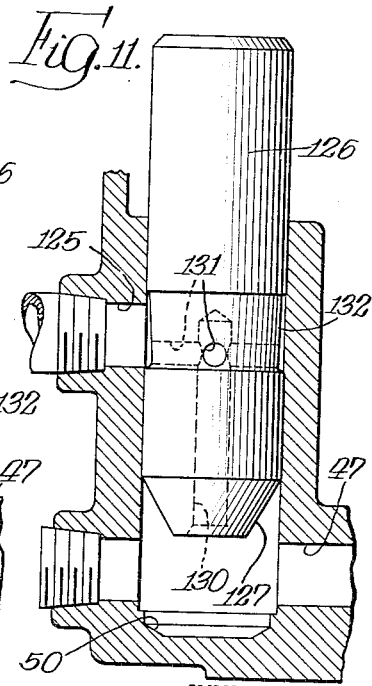

2,727,501

GOVERNOR CONTROLLED PRIME MOVER

Daniel B. Worth, Columbus, Ind., assignor to Cummins Engine Company, Inc., Columbus, Ind., a corporation of Indiana Application April 24, 1950, Serial No. 157,800

13 Claims. (Cl. 123—103)

The invention relates generally to prime movers controlled by governors and more particularly to a governor controlled internal combustion engine.

The general object of the invention is to provide a prime mover and a mechanism driven thereby, and to control the prime mover in a novel manner, both in response to operating characteristics of the prime mover itself and in response to operating characteristics of the mechanism driven thereby.

More specifically, it is an object to provide an internal combustion engine and a torque converter driven thereby, with governing means to control the engine, which is responsive both to the engine speed and to the speed of the output shaft of the torque converter.

Another object is to provide an internal combustion engine and a torque converter driven thereby, with governing means of the foregoing character, in which the governing effect due to the speed of the output shaft of the torque converter overrides any action due to the speed of the engine.

A further object is to provide a prime mover and a mechanism driven thereby, with governing means for controlling the speed of operation of the prime mover, which is normally responsive to the speed of the prime mover itself for control of the latter, but which under certain operating conditions of the driven mechanism will render the control by the prime mover ineffective.

Still another object is to provide a novel governing means for a prime mover, which is responsive to operating characteristics of both the prime mover and a mechanism driven by the prime mover.

Other objects and advantages will become apparent from the following description, taken in connection with the accompanying drawings, in which:

Figure 1 is a side elevational view of a prime mover provided with governor means, embodying the features of the invention.

Fig. 2 is a front elevational view, on an enlarged scale, of the governor means shown in Fig. 1, with a portion thereof in section taken substantially on the line 2—2 of Fig. 1.

Fig. 3 is a vertical sectional view, taken on the line 3—3 of Fig. 2.

Fig. 4 is a vertical sectional view, taken substantially on the line 4—4 of Fig. 2.

Fig. 5 is a horizontal sectional view, taken substantially on the line 5—5 of Fig. 2.

Figs. 6, 7 and 8 are enlarged fragmentary views of a portion of the governor means illustrated in Fig. 3, and showing parts of such governor means in different positions.

Figs. 9, 10 and 11 are views similar to Figs. 6, 7 and 8, but showing a modified form of construction.

It is common practice, in the use of a prime mover, to provide governing means for controlling the speed of the prime mover, with the governing means responsive to the speed of the prime mover. Such prime movers may be used to drive other mechanism and, because of changes of load on the prime mover due to the requirements of such mechanism, the speed of the prime mover will be altered. The governing means on the prime mover, however, in such instances will act to bring the speed of the prime mover to the desired point for the conditions then existing.

There are some instances, however, when the governing means on the prime mover will tend to hold the speed thereof at a point which is excessive for desirable operation of the mechanism driven by the prime mover under the particular load conditions then existing. One instance of this kind is where an internal combustion engine is used to drive a torque converter, which in turn operates equipment such as a crane, a hoist, and particularly when used to operate a power shovel. When the load on such piece of equipment is very light and the output shaft of the torque converter tends to attain a very high rotative speed, overheating of the torque converter occurs. The engine speed, of course, in such instance is controlled by the governing means and tends to remain substantially the same as when a load is placed on the torque converter and the output shaft of the latter operates at a lower speed.

When such light load conditions are encountered, it is desirable to be able to reduce the governed speed of the engine so that the output shaft of the torque converter will thereby be held to a more moderate speed and the converter will thus avoid being overheated. It is, therefore, advisable not only to provide for control of the prime mover in response to its own operating speed, but also to provide a control superimposed upon the first-mentioned control, by which the prime mover may be caused to operate at a speed suitable for the conditions existing in the torque converter. Similar conditions may occur in the operation of an electric generator by a prime mover where it may be desirable to control the prime mover, not only in response to its own speed, but also in response to the power output of the electric generator, measures, say, in volts and amperes. In the case of a hydraulic pump driven by a prime mover, it may be advantageous to control the prime mover not only in response to its own speed, but also in response to the pressure and delivery of the pump. Another instance may be in the case where temperature is a limiting condition for a mechanism driven by the prime mover, and in such case a control sensitive to such temperature condition may be superimposed upon the governor means for the prime mover.

The present embodiment of the invention is shown in connection with an internal combustion engine, preferably of the diesel type, which drives a torque converter. The governor herein disclosed is responsive to the speed of the engine and is provided with means for overriding the effect of changes in speed of the engine, in response to the speed of the output shaft of the torque converter. As herein particularly shown, when the speed of the output shaft of the torque converter tends to become excessive, the means operating in response to such shaft speed will prevent an increase in the engine speed, even though the latter is below the speed at which the engine is normally governed, or if the engine is already operating at such speed as to cause undesirable speeds for the output shaft of the torque converter under the load conditions occurring, the means reponsive to the speed of such output shaft will effect a decrease in the engine speed below its normally governed speed. Thus, excessive speeds at the output shaft of the torque converter will cause an overriding of the governor responsive to the engine speed, so that the resultant engine speed is thereby maintained at a rate proper to produce a suitable speed for the output shaft of the torque converter under the then-exising load conditions.

The governor which is responsive to the speed of the engine is of the hydraulic type, in which fluid under pressure is supplied to an actuator for operating the speed control of the engine, and the means responsive to conditions of the mechanism driven by the engine is in the form of a valve by which pressure fluid supplied to such actuator may be bled off from the actuator. In the case where the means responsive to operating conditions of the mechanism driven by the engine is to be responsive to speed of a given part, such as in the case of the output shaft of a torque converter, then such means is in the form of an auxiliary hydraulic governor having a fluid connection with the main or engine governor so as to control the flow of fluid from the main governor, in response to the speed of the output shaft of the torque converter. While, in this instance, such means takes the form of an auxiliary governor, it will be obvious that a simple valve means, actuated other than by a governor but in response to output conditions of a driven mechanism, may be used.

In the particular arrangement shown in the drawings, the quantity of fuel supplied to each cylinder during each cycle thereof is the factor which controls the speed of operation of the engine, and the particular fuel apparatus shown is of the type known as the Cummins system, wherein a single metering pump is provided for supplying fuel to all of the cylinders. The fuel from such metering pump is delivered to a rotary engine-driven distributor, which in turn distributes the metered quantities of fuel to the respective engine cylinders. The delivery of the metering pump in this type of apparatus is varied to control the speed of the engine, and, to this end, the metering pump may be of the variable stroke type, with control means provided for varying the length of such stroke. Such means includes a control lever connected to and actuated by the hydraulic actuator in the main engine governor.

Spring means connected to the governor is provided, tending to move such control lever in a direction to decrease the speed of the engine, while the application of pressure fluid to the actuator in the main engine governor will increase the engine speed by increasing the stroke of the metering pump of the fuel supply apparatus. Thus, should the auxiliary governor operate to bleed off pressure fluid from the actuator when such fluid is being supplied thereto in response to action of the main engine governor, the hydraulic actuator will not move to increase the speed of the engine, even though such speed may be below that which the main governor tends to cause the engine to attain. If load conditions at the output shaft of the torque converter should change to cause an undesirable increase in the speed of such output shaft, while the engine is operating at its normally governed speed, then operation of the auxiliary governor will bleed off pressure fluid from the actuator and the spring means heretofore mentioned will cause a decrease in the engine speed below the speed called for by the main engine governor. Thus, the auxiliary governor will override the action of the main governor in response to speed conditions of the output shaft of the torque converter.

Both the main governor and the auxiliary governor may be provided with the so-called "speed droop feature," by which the engine speed is caused to be decreased slightly with increasing load. This is accomplished by varying the load of the spring which opposes outward movement of the centrifugal weights in the governor and is entirely automatic in the operation of each governor. The mechanism for effecting such speed droop in the governors are interconnected for the sake of uniform operation and to assist in obtaining stable governor action.

In the drawings, I have shown in Fig. 1 an internal combustion engine of the diesel type, indicated generally at 20, and a torque converter 21 is shown connected to and driven by the engine 20 and is provided with an output shaft 22 arranged to drive a piece of equipment, such as a crane, hoist or power shovel. Mounted on one side of the engine 20 is a fuel supply apparatus 23 illustrated as being of the Cummins type and having a rotary distributor 24 for distributing fuel to the respective cylinders of the engine. The fuel supply apparatus 23 includes a metering pump (not shown), the delivery of which is controlled by a control lever 25. Mounted on the fuel supply apparatus is a main governor, indicated generally at 26, and an auxiliary governor, indicated generally at 27. Both of these governors are illustrated as being of the hydraulic type, and the main governor 26 is adapted to be driven by the engine through a connection with a drive shaft in the fuel supply apparatus 23, which in turn is connected to the crankshaft of the engine. The auxiliary governor 27, being responsive to the speed of the output shaft 22 of the torque converter, is adapted to be driven thereby through a flexible shaft drive, indicated generally at 30, and having in the illustrated form a belt drive connection 31 with the output shaft 22, as shown in Fig. 1.

The main governor 26 is of a type commonly employed with engines of this character and comprises casing structure 32 adapted to be secured to the fuel supply apparatus 23, as shown in Fig. 2. Extending upwardly within the casing structure 32 and journaled therein is a tubular governor shaft 33 having its lower end splined for connection with suitable gearing (not shown) driven by an engine-driven shaft in the fuel supply apparatus 23. The main governor may be adapted to utilize as its hydraulic fluid the fuel oil supplied to the engine by the fuel supply apparatus 23. To this end, the main governor is provided with an intake fitting 34 in the lower part of the casing structure, which is adapted to be connected to a fluid supply which communicates with an intake chamber 35 of a hydraulic pump 36 driven by the governor shaft 33. The pump 36 is here shown in the form of a gear pump and is mounted on the tubular governor shaft 33 adjacent the lower end thereof. The pump 36 delivers the fluid into a pressure chamber 37 formed in the casing structure 32 on the opposite side of the shaft 33 and a passage 40 extends from the chamber 37 around an intermediate portion of the tubular governor shaft 33. The passage 40 is also connected to the intake chamber 35 with a relief valve 41 mounted therein so that, when the gear pump 36 delivers more fluid under pressure than is utilized in the governor, such excess fluid will be returned to the intake side of the pump, the relief valve 41 being of the usual spring-operated type to maintain the pressure within the delivery chamber 37 substantially at a predetermined value.

The tubular drive shaft 33 is provided with a valve plunger 42 (see Fig. 3) for controlling the flow of pressure fluid to the actuator for operating the control lever of the engine. To this end, the tubular drive shaft 33 is provided with an annular groove 43 aligned with the passage 40 and having a plurality of radial ports 44 extending inwardly from the groove 43 to the interior of the tubular drive shaft 33 so that fluid under pressure delivered by the pump 36 may enter the interior of the shaft 33, when the valve plunger 42 permits such flow. The tubular shaft 33 is also provided with a second annular groove 45 provided with ports 46 extending from the interior of the drive shaft so that oil may flow therefrom into a passage 47 formed within the casing structure 32 and communicating with the lower end of a cylinder 50 formed therein, in which a hydraulic actuator in the form of a piston 51 is mounted.

The tubular drive shaft 33 is provided with a head 52 at its upper end, which carries centrifugal weights 53 pivotally mounted therein. The weights 53 are provided with inwardly directed fingers 54 adapted to bear against the underside of a bearing assembly 55 on which is mounted a collar 56 constituting a seat for a coiled spring 57 constituting the speeder spring of the governor. The collar 56 is rigidly secured to the valve plunger 42, and as the centrifugal weights 53 move outwardly and inwardly under the centrifugal action and the force of the spring 57, the valve plunger 42 slides within the tubular shaft 33. The centrifugal force of the weights 53, of course, tends then to move outwardly while the spring 57 tends to resist such outward movement.

The valve plunger 42 is provided with a pair of collars 60 and 61 and has a reduced portion 62 between the collars, the collars slidably fitting within the interior of the tubular shaft 33. Thus, when the valve plunger 42 is in the position shown in Fig. 3, oil delivered by the pump 36 to the pressure chamber 37 will flow through the passage 40, the annular groove 43 in the shaft and the ports 44 into the interior thereof about the reduced portion 62, since the collar 60 is located above the ports 44. The collar 61, however, is located at the ports 46 and closes them so that no oil may flow from the interior of the shaft to the passage 47 and into the cylinder 50. Should the speed of the engine decrease, permitting the spring 57 to move the weights 53 inwardly, the valve plunger 42 will thereby be lowered to position the collar 61 below the ports 46 and permit oil to flow into the passage 47 and the cylinder 50 to raise the piston 51 of the actuator. If the speed of the engine is excessive and the weights 53 have moved outwardly, the valve plunger 42 will be raised, lifting the collar 61 above the ports 47 so that oil within the cylinder 50 may drain through the passage 47, the ports 46 to the interior of the tubular shaft 33 below the collar 61. The lower end of the tubular shaft is open so that the oil from the cylinder 50 may thus drain therefrom, permitting the piston 51 to move downwardly in the cylinder 50.

The upper end of the piston 51 bears against a terminal lever 62 which is of somewhat triangular shape, as illustrated in Fig. 5, and is provided with trunnions 63 pivotally supporting the terminal lever 62 in the casing structure 32. The right-hand trunnion 63, as shown in Fig. 5, extends to the exterior of the casing structure 32 and has secured thereto a governor lever 64. At the free end of the governor lever 64 is attached a governor link 65 extending downwardly and connected to the control lever 25 of the fuel supply apparatus 23, as shown in Fig. 1. The piston 51, when moved upwardly by the admission of oil under pressure to the lower end of the cylinder 50, swings the terminal lever 62 in a direction to cause the control lever 26 to increase the supply of fuel to the engine and thereby increase the speed. When the cylinder 50 is connected to drain through the lower end of the tubular shaft 33, a coiled spring 66 (see Figs. 1 and 4) secured at one end to the governor lever 64 and anchored at its other end to a fixed portion of the fuel supply apparatus, tends to swing the governor lever 64 in a direction to decrease the supply of fuel to the engine and thus decrease the speed thereof. Such swinging movement forces the piston 51 downwardly to discharge oil from the cylinder 50.

The main governor 26 is preferably provided with a so-called "speed droop linkage" which causes a slight decrease in the governed speed of the engine when the load on the engine increases. Thus, as shown in Figs. 3 and 5, the terminal lever 62 is provided with an angle-shaped bracket 70 adjustably mounted on the lever 62 and extending into a slot 71 therein. The bracket 70 is adjustable toward and from the pivotal axis of the lever 62 and is adapted to be secured in adjusted position by means of a screw 72 threaded into the terminal lever 62. The bracket 70 carries a pin 73 extending crosswise of the slot 71, and engaging the pin 73 is a forked floating lever 74. The latter is pivotally supported at one end by a pivot pin 75 mounted in a speed adjusting lever 76. Thus, as the terminal lever 62 is swung on its trunnions 63, the floating lever 74 will also swing by virtue of its engagement with the pin 73, such swinging movement being about the pivot pin 75. Intermediate its ends, the floating lever 74 carries a yoke 77 adapted to engage the upper end of the spring 57 of the governor.

With the foregoing construction, when the piston 51 is moved upwardly by the pressure of the oil in the cylinder 50 and the terminal lever 62 is swung, the pin 73 is likewise moved upwardly to swing the floating lever 74 and thus raise the yoke 77 against which the spring 57 bears. The pressure of the spring 57 is thereby lessened so that the governor weights 53 may move outwardly due to such lessened spring resistance, and the valve plunger 42 will close the ports 46, thereby shutting off the supply of oil to the cylinder 50. The governor weights 53 will thus assume their intermediate or neutral position at a different engine speed because of the change in pressure of the spring 57 due to the raising of the piston 51 and the consequent lifting of the floating lever 74. Should the speed of the engine increase above that called for by the governor, the weights 53 will move outwardly, lifting the valve plunger 42 and permitting some of the oil to drain from the cylinder 50. Such movement will lower the terminal lever 62 and the floating lever 74 to increase the pressure on the spring 57 and thus draw the governor weights back to their neutral or intermediate position. The pressure exerted by the spring 57 is thus varied with the position of the piston 51 and the terminal lever 62, and since the latter controls the speed of the engine through the fuel supply therefor, the pressure exerted by the spring 57 will be varied with the engine speed.

To provide for manual adjustment of the governed speed, the pivot pin 75 supporting the floating lever 74 is carried in the speed adjustment lever 76, which in turn is mounted on a speed adjusting shaft 80 journaled at its ends in the casing structure 32. As shown in Fig. 5, the speed adjusting shaft 80 extends at its left end to the exterior of the casing structure 32 and may receive on the extending portion a suitable lever (not shown) by which manual adjustment thereof may be effected. Such adjustment is brought about by turning of the shaft 80. As shown in Fig. 3, rotation of the shaft 80 in a counterclockwise direction will lower the pivot pin 75 for the floating lever 74 and thus cause the yoke 77 to depress the upper end of the spring 57 and increase the pressure exerted thereby. Counterclockwise adjustment of the speed adjusting shaft 80 obviously will raise the yoke 77 to lessen the pressure exerted by the spring 57.

All of the foregoing structure of the main governor 26 is well known in the art and provides a means by which the engine is governed in response to the speed thereof.

The auxiliary governor 27 is generally similar in construction to the main governor 26 but, as heretofore mentioned, the auxiliary governor 27 is responsive to the speed of the output shaft 22 of the torque converter 21. Thus, the flexible shaft drive 30 extending from the output shaft 22 of the torque converter is provided with a driving connection 81 (see Fig. 2) engageable in the lower end of a tubular shaft 82 mounted in the casing structure 83 of the auxiliary governor 27. The upper end of the tubular shaft 82 is provided with a head 84 (see Fig. 4) carrying centrifugal weights 85 which are provided with fingers 86 pressing against the underside of a bearing assembly 87 on which is mounted a collar 90 providing a seat for a governor speeder spring 91 of the auxiliary governor. Connected to the collar 90 is a valve plunger 92 slidably mounted within the tubular drive shaft 82.

The casing structure 83 is provided with a passage 93 connected by a tube 94 to a passage 95 (see Fig. 3) communicating with the cylinder 50 adjacent the lower end thereof, and the valve plunger 92 in the auxiliary governor is arranged to permit drainage or bleeding of oil from the cylinder 50. To this end, the tubular shaft 82 is provided with an annular groove 96 registering with the passage 93, and ports 97 open from the annular groove 96 into the interior of the tubular shaft. Spaced below the ports 97, the tubular shaft is provided with a second set of ports 100 which open into a chamber 101 provided in a base member 102 supporting the auxiliary governor casing structure 83. The base member 102 also extends under the main governor 26, as shown in Fig. 2, to support the casing structure 32 thereof and is mounted on the casing of the fuel supply apparatus 23. Within the base member 102 is a passage 103 constituting a drain from the chamber 101 below the auxiliary governor and communicating with the interior of the fuel supply apparatus 23. The base member 102 also is provided with a hub portion 104 which rotatably supports the lower end of the tubular drive shaft 82 and the flexible shaft drive 30.

The auxiliary governor 27 is arranged to control the bleeding of oil from the cylinder 50 through the passage 95, the pipe 94, the passage 93, the tubular drive shaft 82 and the chamber 101. To this end, the valve plunger 92 is provided with a pair of collars 105 and 106 (see Fig. 4) having a sliding fit within the tubular shaft 82. The upper collar 105 normally closes the ports 97 in the tubular shaft 82 so that no oil will be drained from the cylinder 50. However, should the speed of the output shaft 22 of the torque converter 21 become excessive, the governor weights 85 will move outwardly, lifting the collar 90, thereby moving the valve plunger 92 upwardly to shift the collar 105 away from the ports 97 and permit oil to flow into the interior of the shaft 82. The lower end of the tubular shaft 82 is plugged, as at 107, so that any oil permitted to flow into the interior of the shaft will flow outwardly through the ports 100 into the chamber 101 and thus pass through the passage 103 to drain into a sump.

Thus, when the speed of the output shaft 22 of the torque converter becomes excessive, oil will be drained from the cylinder 50 and thus override the action on the piston 51 caused by the main governor 26. If, at the moment that the governor weights of the auxiliary governor shift the valve plunger 92 to permit bleeding of oil from the cylinder 50 through the auxiliary governor, the main governor is calling for an increase in speed and, therefore, is supplying oil to the cylinder 50, the oil so supplied will be bled off through the passage 95 and consequently piston 51 will not be moved upwardly to increase the engine speed. The engine speed will thus be maintained so that the speed of the output shaft 22 of the torque converter will not reach a greater excess. Should the speed of the output shaft of the torque converter 22 cause an upward movement of the auxiliary governor weights to cause a bleeding of oil from the piston 50 at a time when no oil is being supplied to the cylinder 50 by the main governor 26, or if the bleeding exceeds the amount of oil supplied by the main governor, then such bleeding of oil from the cylinder 50 will permit the piston 51 to move downwardly and thus reduce the engine speed to that called for by the auxiliary governor 27. The main governor thus normally controls the speed of the engine, but should the speed of the output shaft 22 of the torque converter become excessive, the auxiliary governor 27 will take over control by bleeding oil from the cylinder 50 to decrease the engine speed.

The auxiliary governor 27 is also provided with speed droop linkage similar to that shown in the main governor 26, but since the auxiliary governor 27 does not have any piston actuator similar to the piston 51 in the main governor, the terminal lever, indicated at 110 in Figs. 4 and 5, of the auxiliary governor is interconnected with the speed droop mechanism of the main governor. Thus, the terminal lever 110 of the auxiliary governor is provided with trunnions 111, with one extending externally of the casing structure 83 at the side adjacent the main governor. On the outer end of the extending trunnion 111 is mounted a lever 112 connected at its free end by a link 113 to the governor lever 64 of the main governor. Thus, as the terminal lever 62 of the main governor is rocked on its trunnions 63, the terminal lever 110 of the auxiliary governor will be correspondingly rocked on its trunnions 111.

Movement of the terminal lever 110 is utilized to adjust the pressure of the governor spring 91. To this end, the terminal lever 110 is provided with an adjustable speed droop bracket 114 (see Figs. 4 and 5) carrying a pin 115 engageable in a forked floating lever 116. The floating lever 116 is pivotally supported by a pivot pin 117 and carries intermediate its ends a yoke 120 engaging and bearing against the upper end of the governor spring 91. Thus, upon movement of the terminal lever 110, the pressure exerted by the governor spring 91 will be varied. The pivot pin 117 for the floating lever 116 is carried by a speed adjusting lever 121 pivotally supported for adjustment by a speed adjustment shaft 122. The latter extends externally of the casing, as at 123, and may be provided with means for rotating the shaft manually to effect the adjustment.

It is desirable that the auxiliary governor should only operate to drain or bleed oil from the cylinder 50 when the engine is operating at its higher speeds. The lower engine speeds, of course, would not result in excessive speeds for the output shaft 22 of the torque converter, so that no overriding of the main governor is needed for such lower speeds. This is particularly true at idling speed where it is desirable that the engine be operated solely under the control of its own speed characteristics. For this reason, the bleed passage 95 leading from the cylinder 50 is arranged to be open only when the engine is operating at higher speeds. Operation of the engine at such higher speeds occurs only when the piston 51 is in an elevated position. Consequently, the piston 51, in addition to its function of controlling the speed of the engine, also is utilized to control the opening of the bleed passage 95.

Control of the opening of the bleed passage 95 is illustrated in Figs. 6, 7 and 8 of the drawings. Thus, in Fig. 6, the position of the piston 51 when the engine is stopped is shown. In this position, the piston is in its lowermost position and is shown as having its lower end seated against the casing structure. The lower end, however, is tapered as at 124, so that oil supplied through the passage 47 to the cylinder 50 may encircle the tapered end 124 and start the movement of the piston 51 upwardly. The bleed passage 95, however, is well above the lower end of the cylinder 50 and thus remains closed. In Fig. 7, I have shown the position of the piston 51 when the engine is operating at idle speed. Thus, the piston has been raised a short distance so that the oil in the cylinder 50 can exert its pressure against the full area of the lower end of the piston. However, the bleed passage 95 still is closed by the piston.

When the piston 51 is moved upwardly above its idle speed position, then, as soon as the tapered portion 124 reaches the lower edge of the bleed passage 95, communication between the bleed passage and the cylinder 50 is established. The tapered portion, however, as well as the fact that only a portion of the passage 95 is opened thereby, will prevent any large flow through the bleed passage at intermediate speeds, particularly those slightly above the idling speed. When the engine is operating at its maximum speed, the piston 51 has risen sufficiently to fully open the bleed passage 95, as shown in Fig. 8. Consequently, at maximum speed, the full effect of any bleeding permitted by the auxiliary governor 27 can be utilized. It is true, of course, that only at maximum engine speed is the speed of the output shaft 22 of the torque converter apt to be excessive. Consequently, the maximum opening of the bleed passage 95 is needed only at such time, and Fig. 8 of the drawing clearly illustrates the fact that oil may be freely drained from the cylinder 50 when the piston 51 is in its maximum speed position.

In Figs. 9, 10 and 11, I have shown a modified form of piston for use in the cylinder 50. Thus, the cylinder in this instance is provided with a bleed passage 125 located in its side wall substantially above the passage 47. The piston in this instance, indicated at 126, is provided with a tapered lowered end 127 and is also provided with a central axially extending passage 130 opening at the lower end of the piston. The central passage 130 extends upwardly and, intermediate the ends of the piston 126, the passage 130 communicates with radial passages 131. At the outer end of the radial passages 131, the piston 126 is provided with an annular groove 132 which, as is evident, is tapered upwardly.

When the engine is topped and the piston 126 is in its lowermost position, the central passage 130 is closed at its lower end because the piston rests on the casing structure. Also, at this time, the tapered groove 132 is below the bleed passage 125. Fig. 10 shows the position of the piston when the engine is operating at idle speed, and in this position the piston has been raised slightly from the bottom of the cylinder 50, permitting oil to enter the central passage 130, but the groove 132 is still below the bleed passage 125. As the speed of the engine increases from idle speed toward its maximum speed, the groove 132 in the piston moves into communication with the bleed passage 125 until, at its maximum speed, the groove 132 is directly opposite the passage 125, as shown in Fig. 11, so that the maximum flow of oil from the cylinder 50 may take place under such position of the parts. As the piston 126 moves upwardly from its idle speed position shown in Fig. 10, the groove 132 gradually opens the bleed passage 125 and, because of that fact and because of the tapered form of the groove 132, the amount of flow that may take place through the bleed passage will be gradually increased until the maximum flow is permitted under the conditions shown in Fig. 11. Thus, both the arrangement shown in Figs. 6, 7 and 8 and the arrangement shown in Figs. 9, 10 and 11 permit a gradual increase in oil bled from the cylinder 50 as the speed of the engine increases above its idle speed. At the maximum speed position of the piston in each of these forms, the maximum flow through the bleed passage is permitted.

I claim:

1. The combination of a prime mover, a torque converter driven by said prime mover and having an output shaft, a hydraulic governor responsive to the speed of the prime mover for controlling the prime mover, and a second governor responsive to the speed of said output shaft and having a fluid connection with said first governor for varying the action of the latter in controlling the prime mover.

2. The combination of a prime mover, mechanism driven by said prime mover, a hydraulic governor driven by and responsive to the speed of the prime mover for controlling the latter, and a second governor driven by and responsive to the speed of said mechanism, the only connection between said governors being a fluid connection for varying the action of the first governor in controlling the prime mover.

3. The combination of a prime mover, mechanism driven by said prime mover, a hydraulic governor driven by said prime mover and having a pressure fluid actuator for controlling the prime mover, and auxiliary control means operable by said mechanism independently of said prime mover and having a bleed passage connected to said actuator only for bleeding pressure fluid therefrom to decrease the action of said governor in controlling the prime mover.

4. The combination of a prime mover, mechanism driven by said prime mover, a source of pressure fluid, a hydraulic actuator for controlling said prime mover, a hydraulic governor driven by said prime mover and controlling the flow of pressure fluid from said source to said actuator, and auxiliary control means operable by said mechanism independently of said prime mover and having a bleed passage connected to said actuator for bleeding pressure fluid therefrom to decrease the control of the prime mover by said actuator.

5. The combination of a prime mover, mechanism driven by said prime mover, a source of pressure fluid, a hydraulic actuator connected to said prime mover and adapted when pressure fluid is supplied thereto to increase the speed of the prime mover, spring means tending to decrease the speed of the prime mover, and auxiliary control means operable by said mechanism independently of said prime mover and connected to said actuator for bleeding pressure fluid therefrom to permit said spring means to decrease the speed of the prime mover.

6. The combination of an internal combustion engine, a torque converter driven by said engine and having an output shaft, a hydraulic governor driven by said engine and normally controlling the speed thereof, and a second governor driven by said output shaft and having a fluid connection with said first governor for bleeding fluid therefrom when the speed of the output shaft becomes excessive.

7. Governing means for a prime mover, comprising a main hydraulic governor adapted to respond to the speed of the prime mover, and an auxiliary control means adapted to respond to an operating characteristic of a mechanism driven by said prime mover and operatively connected with said main governor only by a fluid connection, said auxiliary control means being operable by said operating characteristic exceeding a predetermined value to bleed fluid from said actuator through said fluid connection.

8. Governing means for a prime mover, comprising a main governor including a pressure fluid actuator for controlling the speed of the prime mover, and speed responsive valve means adapted to be driven by the prime mover for controlling the flow of pressure fluid to said actuator, and auxiliary valve means operable independently of said speed responsive valve means and adapted to be controlled by a mechanism driven by the prime mover and having a bleed connection with said actuator for bleeding fluid therefrom.

9. Governing means for a prime mover, comprising a main governor comprising spring means adapted to be connected to the prime mover and tending to decrease the speed thereof, a pressure fluid actuator for increasing the speed of the prime mover, and valve means responsive to the speed of the prime mover for controlling the flow of pressure fluid to said actuator, and auxiliary valve means operable independently of said first-mentioned valve means and adapted to be controlled by a mechanism driven by the prime mover and having a bleed connection with said actuator for bleeding fluid therefrom.

10. Governing means for controlling a prime mover in response to the speed thereof and to an operating characteristic of mechanism driven by the prime mover, comprising a main hydraulic governor having a pressure fluid actuator, a pressure fluid supply passage, and speed responsive valve means controlling the flow in said passage, and auxiliary control means having a bleed passage connected to said supply passage, and valve means operable independently of said speed responsive valve means for controlling the flow through said bleed passage.

11. Governing means for controlling an internal combustion engine in response to the speed thereof and to the speed of the output shaft of a torque converter driven by said engine, comprising a main hydraulic governor having a pressure fluid actuator, a pressure fluid supply passage, and speed responsive valve means adapted to respond to the speed of said engine and controlling the flow in said passage, and an auxiliary governor operable independently of said main governor and having a bleed passage connected to said supply passage, and speed responsive valve means adapted to respond to the speed of said output shaft and controlling the flow through said bleed passage.

12. Governing means for controlling an internal combustion engine in response to the speed thereof and to the speed of the output shaft of the torque converter driven by said engine, comprising a main hydraulic governor having a pressure fluid actuator, a pressure fluid supply passage, a valve controlling the flow in said passage, means for shifting said valve comprising centrifugal means and a speeder spring, and manually operable means for adjusting the pressure of said spring, and an auxiliary governor having a bleed passage connected to said supply passage, a valve controlling the flow through said bleed passage, means for shifting said last-mentioned valve comprising centrifugal means and a speeder spring, and manually operable means for adjusting the pressure of said last-mentioned spring.

13. Governing means for controlling an internal combustion engine in response to the speed thereof and to an operating characteristic of mechanism driven by the engine, comprising a main hydraulic governor having a pressure fluid actuator comprising a cylinder and a piston movable from a stop position through an idle speed position to a maximum speed position to control the speed of the engine, a pressure fluid supply passage connected to said cylinder, and valve means responsive to the engine speed for controlling the flow of pressure fluid in said passage, said piston having a tapered neck of reduced diameter intermediate its ends and a passage leading from the lower end of the piston to the space about said neck, and said cylinder having an opening in the side thereof located above said neck when the piston is in the idle speed position, and auxiliary control means having a bleed passage connected to said opening, said bleed passage being closed when said neck is below said opening and being gradually opened by movement of the piston to bring said neck opposite said opening; and valve means responsive to said operating characteristic for controlling the flow through said bleed passage when the space about said neck is in communication with said opening.

References Cited in the file of this patent

UNITED STATES PATENTS

| | | |
|---|---|---|
| 1,868,130 | Bauer et al. | July 19, 1932 |
| 2,221,791 | Ferguson | Nov. 19, 1940 |
| 2,302,322 | Howard | Nov. 17, 1942 |
| 2,324,516 | Kalin | July 20, 1943 |
| 2,344,308 | Kalin | Mar. 14, 1944 |
| 2,364,115 | Whitehead | Dec. 5, 1944 |
| 2,364,116 | Whitehead | Dec. 5, 1944 |
| 2,411,290 | Pontius | Nov. 19, 1946 |
| 2,452,088 | Whitehead | Oct. 26, 1948 |
| 2,503,362 | Sweet | Apr. 11, 1950 |
| 2,602,655 | Gesner | July 8, 1952 |